United States Patent [19]

Hiratake et al.

[11] 4,048,436
[45] Sept. 13, 1977

[54] HEAT TREATING

[75] Inventors: Susumu Hiratake, Kasugaishi; Mitsuhiro Matsui, Nagoya, both of Japan

[73] Assignee: Daidotokushuko-Kabushikikaisha, Nagoya, Japan

[21] Appl. No.: 619,087

[22] Filed: Oct. 2, 1975

[30] Foreign Application Priority Data

Oct. 2, 1974 Japan .................................. 49-114216
Oct. 12, 1974 Japan .................................. 49-117265

[51] Int. Cl.[2] .......................... H05H 1/10; H05B 7/00
[52] U.S. Cl. ......................................... 13/2 P; 13/11; 219/123
[58] Field of Search ............... 13/2, 2 P, 9, 34, 18, 13/11; 75/10 R; 164/50, 250, 252; 219/121 P, 123

[56] References Cited

U.S. PATENT DOCUMENTS

| | | | |
|---|---|---|---|
| 1,562,825 | 11/1925 | Evreynoff | 13/11 |
| 3,294,954 | 12/1966 | Ramsey | 219/123 |
| 3,378,713 | 4/1968 | Ludwig | 219/123 X |
| 3,496,280 | 2/1970 | Dukelow et al. | 13/9 |
| 3,736,361 | 5/1973 | Lakomsky et al. | 13/34 |
| 3,940,641 | 2/1976 | Dooley | 219/123 X |

FOREIGN PATENT DOCUMENTS 1,237,115  6/1971  United Kingdom .................. 164/50

Primary Examiner—R. N. Envall, Jr.
Attorney, Agent, or Firm—William Anthony Drucker

[57] ABSTRACT

A heat treating apparatus including a crucible to contain molten metal, at least one plasma ejecting nozzle which is constructed so as to generate a plasma jet and is secured with respect to the crucible around the central axis of it and a magnetic field generating means to generate a magnetic field interacting with the plasma jet and deflecting it.

3 Claims, 14 Drawing Figures (A)

(B)

HEAT TREATING

BACKGROUND OF THE INVENTION

This invention relates to a heat treating apparatus in which metals in various forms such as powders or rods are melted by gaseous plasmas.

Such a heat treating apparatus is conventionally known in which metals are melted with a gaseous plasma ejected from nozzles in the form of a plasma jet. However, molten metal in a cooling crucible of a heat treating apparatus making use of a single plasma jet assumes a funnel-shaped form and so generated ingots are a inhomogeneous structure with characteristic patterns. This inhomogeneity itself of ingots leads to a disadvantage of decreasing the mechanical strength of metallic material. On the other hand, when the metal to be melted includes non-metallic components, the non-metallic components in a molten pool are forced into the inner portion of the ingot by crystallization surfaces, which results in the contraction and split of the ingot and makes difficult the mechanical work up of the ingot.

This inhomogeneity in the ingot is moderated considerably by arranging a plurality of plasma jets around the central axis of the apparatus and effectuating sectionalized heating. This inhomogeneity is moderated futher by setting and fixing the plural plasma jets beforehand such that the jetting velocities of the plural plasma jets have components in the circumferential direction of the apparatus. In this case, the molten metal is caused to revolve around the axis of the apparatus by the kinetic energy of the plasma jets. However, if the sectionalized heating and the revolution of the molten metal are to be done effectively by the plural plasma jets, the positions and directions of the nozzles must be set precisely aforehand based on the analysis of the estimate of the flow pattern and the temperature distribution of the molten metal. Moreover, when the operating conditions of the heat treating apparatus vary according to the components of the raw metal and the requirement on the constitution of the ingot, the plural nozzles must be rearranged for an optimum condition.

SUMMARY OF THE INVENTION

A heat treating apparatus according to the present invention has not only plasma jets but also a magnetic field generating means to generate a magnetic field in a suitable direction not parallel with the direction of the direct current flowing in the plasma. The plasma current for heating flows through a negative electrode in a nozzle and the plasma jet and interacts with the magnetic field electro-magnetically at the plasma jet. The plasma jet is deflected such that its jetting velocity has a component in the circumferential direction around the central axis of the apparatus. The arrangement of plural plasma jets thus attained as the result of the deflection by magnetic field is equivalent to that due to the setting of plural nozzles. The degree of the deflection or the position of the plasma jets can be adjusted easily by controlling the current for the magnetic field. The interaction of a direct plasma current with an alternating magnetic field deflects the plasma jet oscillatingly with a constant amplitude around an undeflected average position. The interaction of the direct plasma current with an alternating current superposed on a direct current deflects the plasma jet oscillatingly around a deflected average position. According to the aforesaid features, the control of the deflection of the plasma jet and therefore the sectionalized heating and the revolution of the molten pool can be done simply by controlling the current for the magnetic field. The feasibility in this control contributes to production of homogeneous ingots and enlarges the range of application of the heat treating apparatus.

In the present invention, a plasma is subjected also to a rotating magnetic field and is rotated together with it. A centrifugal force is then exerted on the plasma as a result of its rotation and thickens the plasma. This or enlarged thickened plasma can be used advantageously when a plasma is to be projected wholly on a wide range for heat treatment. For example, when metallic or non-metallic materials to be treated are melted, they can be treated wholly and homogeneously and have improved quality after treatment. Further, as the plasma is rotated by the rotating magnetic field and then enlarged mechanically by the resulting centrifugal force, even a weak rotating magnetic field sufficient solely to rotate the plasma can thicken the plasma largely. Thus, the plasma can be thickened effectively for a certain constant energy to maintain the rotating magnetic field. Still further, the application of the rotating magnetic field on the plasma consisting of electrically conductive gas gives a possibility that the electrically conductive gas is supplied with energy electromagnetically and heated to a higher temperature.

Figure 1:
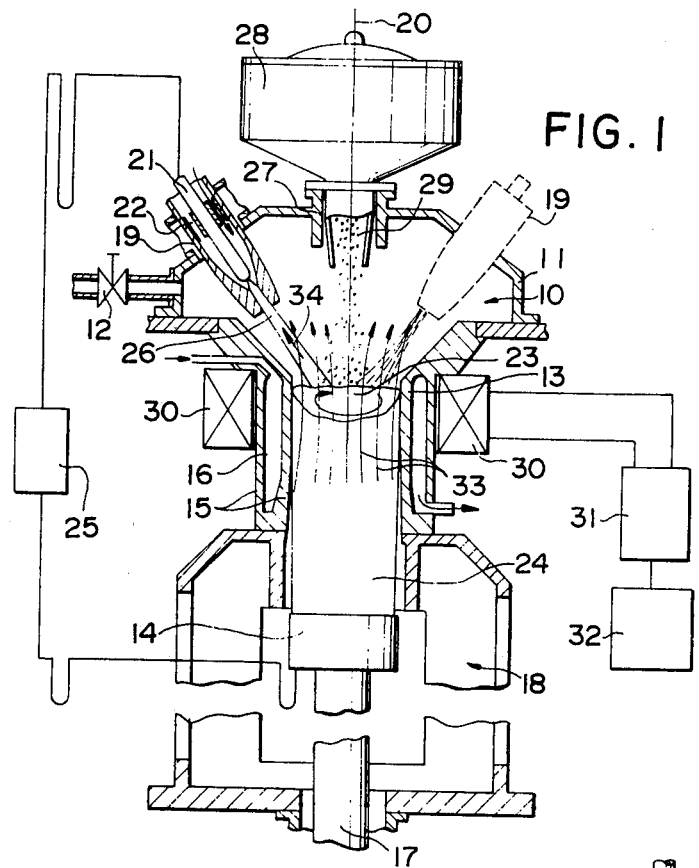
FIG. 1 is a longitudinal section of a heat treating apparatus.

Referring to FIG. 1, a gas-tight melting chamber 10 is defined by a wall 11 and an atmosphere suitable for melting is introduced in the chamber 10 through a valve 12. At the lower part of the melting chamber 10, a cylindrical crucible 13 is provided, communicating with said lower part. The crucible 13 comprises an electrically conductive bottom 14 and a twofold side wall 15 and a toroidal space 16 formed by the twofold side wall 15 serves as a passage for cooling water. This twofold side wall 15 is made of non-magnetic material and has preferably poor electrical conductivity if an alternating magnetic field is used. A vertically reciprocable pulldown rod 17 is connected to the bottom 14 and is driven by a well known pull-down mechanism (not shown). Under the crucible 13 is formed an ingot chamber 18. Near the shoulder portion of the melting chamber 10, three nozzles 19 are set circumferencially equally spaced around the center axis 20 of the crucible 13, each of the nozzles being directed obliquely downwards. A straight line prolonged from each nozzle meets an imaginary circle drawn on the top of molten metal 23 to be mentioned later. Each nozzle 19 has a coaxial negative electrode 21 in it and suitable neutral gas to become plasma through ionization is introduced through a toroidal passage 22 formed between the electrode 21 and the inner surface of the nozzle 19. This gas is preferably fed in such a quantity or at such a pressure that the gas has considerable kinetic energy after becoming plasma and being ejected from the nozzle 19 and can maintain the initial direction of its jetting velocity with sufficient inertia unless an external forces exerts on it. The number of nozzles 19 is not limited to three but is determined suitably together with the mounting positions of the nozzles, the angle made by the nozzle with respect to the central axis 20 and the diameter of the nozzle so that the optimum condition may be attained for melting the metal under consideration. Molten metal 23 is formed in the upper region of the crucible 13 and cooled gradually to join integrally to an ingot 24 in the lower region of the crucible. A direct current power source 25 for generating plasma is connected between the negative electrode 21 and the bottom 14 as a positive electrode and a plasma jet 26 is formed between the negative electrode 21 and the molten metal 23 forming a part of the circuit for the plasma current. On the top of the melting chamber 10, a raw material inlet 27 is provided, over which a raw material hopper 28 is mounted. In the hopper 28, powdered metal 29 to be molten is contained. Outside the crucible 13 and around the molten metal 23, an air core coil 30 is placed as the substantial portion of a magnetic field generating means. The air core coil 30 is fed from a magnetic field generating source 32 through a current controlling means 31. The source can be of direct, alternating or superposed direct and alternating type.

Figure 4:
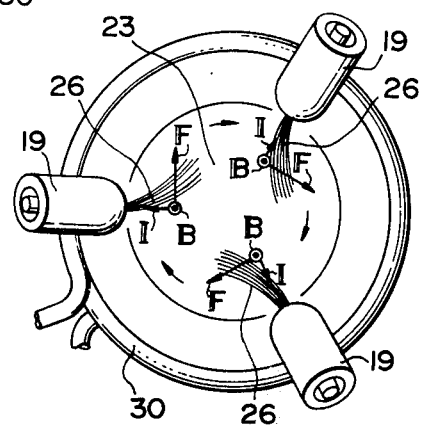
FIG. 4 is a plan view of the arrangement shown in FIG. 3.

In the apparatus constructed as mentioned above, the powdered metal 29 is thrown down from the raw material inlet 27 and is melted in the upper region of the crucible 13 by the plasma jet 26 ejected with its proper velocity. The melting of the raw material is done while the bottom 14 of the crucible 13 is lowered gradually by the pulldown rod. Accordingly, the raw material which is melted earlier is placed at the lower region of the crucible and is taken out in order to the ingot chamber 18 as the ingot 24. Now, if the magnetic field source 32 is of direct current type, a direct current magnetic field 33 is produced in the axial direction of the apparatus and the plasma current, which flows in the plasma jet 26 in the direction shown by an arrow 34, is subject to an electromagnetic force to be deflected as the result of its interaction with the magnetic field 33. If the magnetic induction vector is B and the plasma current vector is I, the electromagnetic force F exerted on a unit length of it is I × B and so the plasma jet 26 before deflection is subject to a force F in the clockwise direction as shown in FIG. 4 due to the outward radial component of the plasma current before deflection and the upward axial component of the magnetic induction. As the result of this, the plasma jet 26 is driven circumferentially at least initially. The ultimate deflected position of the plasma jet 26 is to be determined in an overall way by the distribution and intensity of the magnetic field, the jetting inertia of the plasma jet, the agglutinate property of the arc spot on the molten metal 23 and the energy of the plasma jet 26. Now, suppose that the plural plasma jets 26 are deflected ultimately so that they may have circumferential velocity components as shown in FIG. 4. As a means to adjust the positions of delfected plasma jets, the control means 31 serves in the case of the present embodiment. The plasma jets 26 as shown in FIG. 4 rotate the molten metal 23 in the clockwise direction of FIG. 4 due to the circumferential momentum of them. This rotation has an effect to make the metal homogeneous all through its molten and solidified phases. On the other hand, the current Io flows convergently towards plural arc spots under the lower ends of the plasma jets 26 and so the current Io has generally a component not parallel with the magnetic field 33. Another possibility for driving the molten metal occurs according to the inertia mass, and the viscosity of the molten metal on account of the interaction of this current component with the magnetic field. When the molten metal has a considerable electric conductivity, an eddy current is induced in the molten metal as the result of its movement and the interaction of this induced current with the magnetic field has a tendency to prevent the rotation of the molten metal. However, this tendency is interpreted as the retention of the plasma in the magnetic field and does not exceed the primary driving of the molten metal by the plasma jet 26 as the frictional force does not surpass the original driving force. When the molten metal is magnetizable material, the intensity of magnetic induction is increased but such an arrangement is desirable in which attractive force is not exerted on the molten metal.

Figure 5:
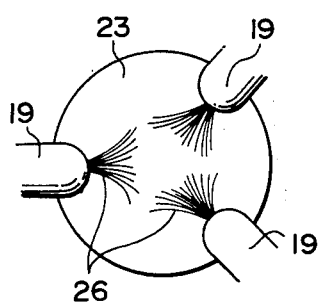
FIG. 5 is a view similar to FIG. 4 but in the case when a plasma interacts with an alternating magnetic field.
Figure 6:
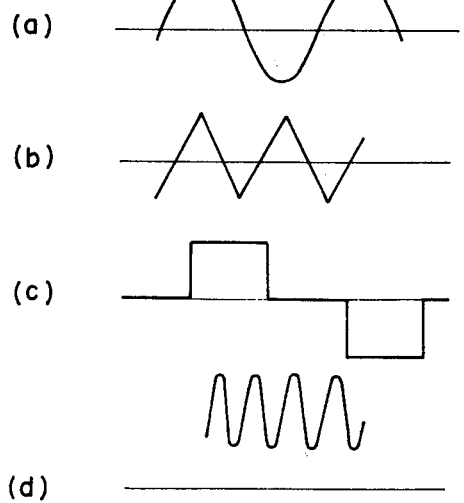
FIG. 6 is a view showing examples of currents for alternating magnetic field.

When the plasma current is direct and the magnetic field current is sinusoidal, saw-teeth wise or rectangular as shown in FIG. 6 (a)–(c), the plasma jet 26 is deflected oscillatingly about an undeflected average position. If the period of the various alternating currents for the magnetic field is considerably shorter, the tip of the plasma jet 26 is thickened apparently as shown in FIG. 5 and the plasma jet 26 can heat homogeneously such portion of an object to be melted that is considerably larger than the inherent cross-section of the plasma jet 26. If a sinusoidal current superposed on a direct one as shown in FIG. 6 (d) is used as the magnetic field current, the plasma jet 26 is deflected oscillatingly around a deflected average position and thus, the control of the deflected position of the tip of the plasma jet and that of the effective enlargement of the plasma jet 26 can be done simultaneously. When an alternating magnetic field is used, it must be taken into consideration that any electrically conductive material used as a constructional member should not be placed in a magnetic field region and the magnetic energy should not be dissipated as heat through inductive heating.

Figure 2:
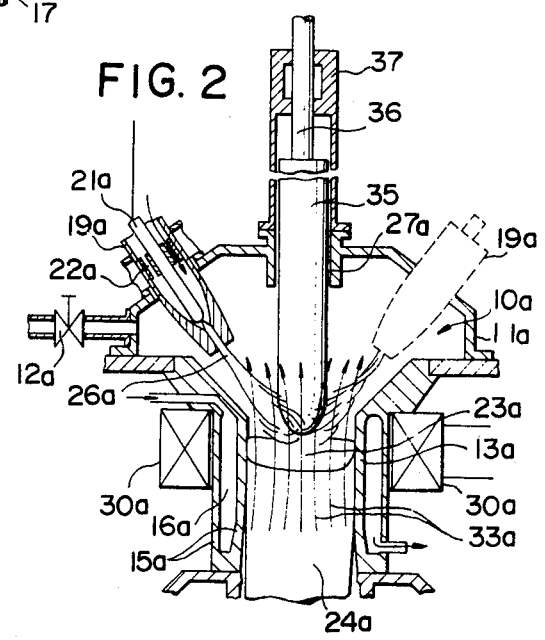
FIG. 2 is a view similar to FIG. 1 but showing another embodiment.
Figure 3:
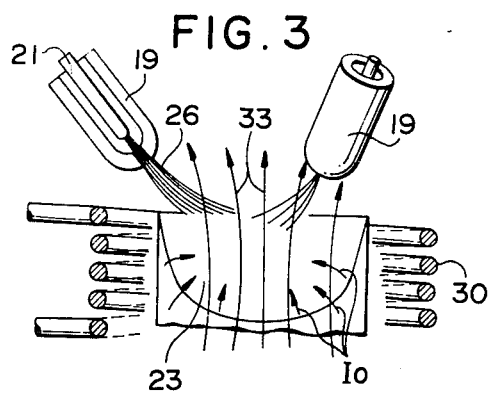
FIG. 3 is a view showing a plasma jet, a magnetic field coil and a current distribution in a molten pool.

Next, another embodiment is described referring to FIG. 2. Those members in FIG. 2 which are similar substantially in construction to those in FIG. 1 are given reference numerals with alphabetical suffices a, but the same as given to corresponding members in FIG. 1 and the repeated description of these members is omitted. A rod-shaped raw material 35 protrudes a melting chamber 10a through a raw material inlet 27a and the upper part of the raw material is sustained by a vertically reciprocable holding rod 36. The holding rod 36 is placed for vertical reciprocation in a holding frame 37 mounted over the raw material inlet 27a and is actuated at its upper end by a lowering mechanism (not shown). In the apparatus of this embodiment, the rod-shaped raw material 35 is melted from its lower end by a plasma jet 26a while the rod-shaped raw material is lowered.

Figure 7:
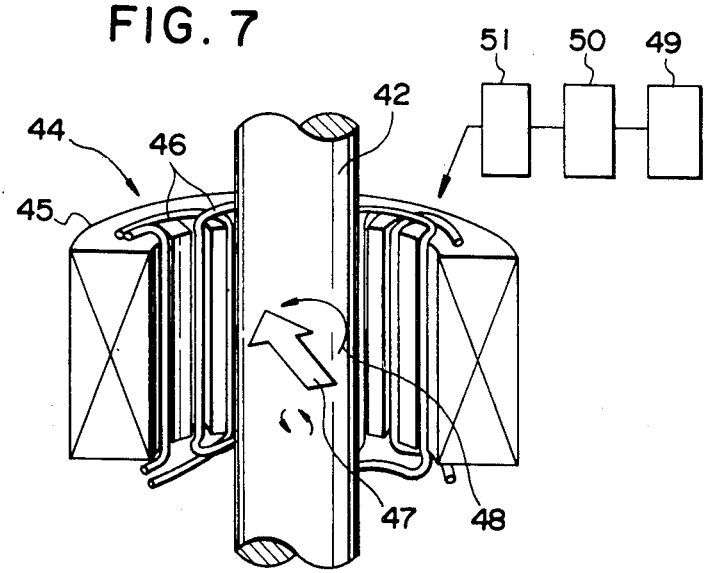
FIG. 7 is a perspective view partly in section of a means to generate a rotating magnetic field.
Figure 8:
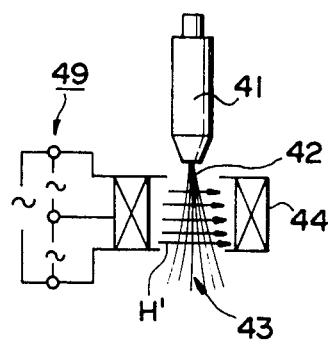
FIG. 8 is a abbreviated front elevational view of a heat treating apparatus making use of a rotating magnetic field.
Figure 9:
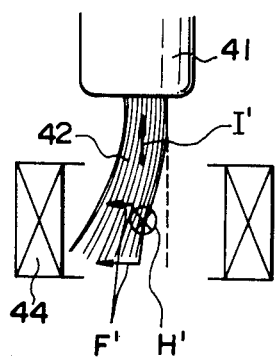
FIG. 9 is a view showing the deflection of the plasma shown in FIG. 8.
Figure 9:
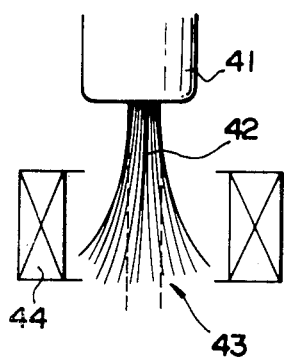

Referring to FIGS. 7-9, numeral 41 represents a device from which an electrically conductive gas at high temperature is ejected and which is called generally a plasma torch. Various plasma torches generally known can be used such as those of transfer type or non-transfer type. Numeral 42 shows a plasma ejected from the plasma torch 41 and numeral 43 represents a treatment region where the plasma is projected and an object to be treated is heat-treated. Next a rotating magnetic field generating means 44 mounted near by the plasma 42 is described. Numeral 45 shows an iron core which is similar to that of the stator of an electric motor. Numeral 46 shows coils wound on the iron cores 45 in a usually known but arbitrary manner and the coils are connected electrically such that it can produce a rotating magnetic field to be described below when it is fed from a three-phase (or other multiphase) alternating current power source. An arrow 47 shows the direction of the magnetic field produced by the coils 46 and this direction rotates along an arcuate arrow 48 according to the change of the phases of the power source feeding the plural coils 46. The rotational direction shown by the arcuate arrow 48 may be reversed or changed oppositely after a certain time interval or by a certain angle. Numeral 49 represents a three-phase commercial frequency power source. This power source can be understood as an other multi-phase alternating current power source. In such case, the aforesaid coils are connected correspondingly. Next, a control means to adjust the properties of the rotating magnetic field is described. Numeral 50 represents a rotating speed adjusting means which is constructed so as to change the rotational speed of the rotating magnetic field by changing the frequency of the power source feeding the rotational magnetic field generating means 44 with a frequency converter or by changing the connection of the coils to change the number of poles of the means 44. Numeral 51 represents a field intensity adjusting means which changes the voltage or the current of the power source feeding the means 44 to adjust the intensity of the magnetic field generated by said means. The rotating speed adjusting means 50 and the field intensity adjusting means 51 may be exchanged in the order of electrical connections.

In the apparatus constructed as mentioned above, a magnetic field rotable in the direction shown by the arrow 48 is applied to the plasma 42 in a direction crossing the axis of the plasma as shown by the arrow 47 in FIG. 7. Then, the electrically conductive plasma 42 is rotated in the same direction as that of the rotating magnetic field (the arrow 48) according to the operational principle of a well-known induction motor. When the plasma 42 is thus rotated, a centrifugal force acts on the plasma to extend it outwardly and the plasma 42 is projected on a wider region for treatment as shown in FIG. 8. The extent of the enlargement of the plasma 42 is determined by the rotational speed of the plasma 42 and this rotational speed depends on the intensity and the rotational speed of the rotating magnetic field. Thus, the volume of the plasma 42 extended by the rotating magnetic field can be controlled ultimately any one of the capacity, the number of phases and the frequency of the alternating power source and the number of poles of the magnetic field generating means 44.

On the other hand, if the plasma 42 is a plasma generated by the plasma torch 41 of transfer type, then a current I' flows in the plasma in the direction opposite to the plasma flow as shown in FIG. 9 (A). This current interacts with the magnetic field H' to be subject to a force F' in accordance with Fleming's left hand law and the plasma is deflected as a whole as shown. Because the magnetic field H' is always rotating as mentioned, the deflected plasma seems to be enlarged as shown in FIG. 9 (B) if it is observed in a long time interval (longer than the period of the rotating magnetic field) comparable with the time during which the heat treatment of the object is done.

In this case, the extent of the enlargement of the plasma 42 is controlled by the current I' flowing in the plasma as well as the factors aforesaid in the case of previous embodiments.

Figure 10:
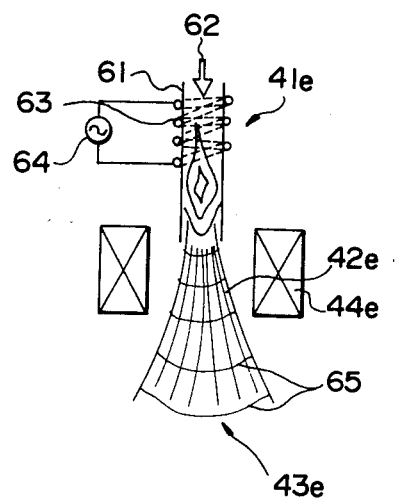
FIG. 10 is a view showing an arrangement to enlarge an inductively produced plasma.

Next, FIG. 10 shows an embodiment in which an inductively produced plasma is enlarged. In a plasma torch 41e of this embodiment, a gas, which is introduced into a heatproof pipe 61 such as a quartz tube in a direction shown by an arrow 62, is heated inductively by a coil 63 which is wound on the heatproof pipe 61 and fed by a high frequency power source 64. The gas is changed into a plasma 42e which is ejected. The plasma 42e thus generated is rotated by the rotating magnetic field and enlarged due to the resulting centrifugal force as in the previous case. When the plasma 42e is subject to the rotating magnetic field generated by the rotating magnetic field generating means 44e, an induced current flows in the plasma and so the plasma is heated also by this induced current. Because the plasma is more heated at its surface rather than its interior by induction heating on account of the skin effect, the rotating magnetic field has an effect to heat the surficial portion rather at a low temperature by its nature besides the enlargement of the plasma. This effect further contributes to the homogeneous heating of the plasma. Thus, the enlarged plasma 42e with a wide and homogeneous temperature distribution as shown with contour-lines 65 is projected on the treatment region 43e. In this embodiment, those members are given the same reference numerals with alphabetical suffices e as in FIGS. 7-9 which are same in construction or function as corresponding members in these figures and repeated description has been omitted. (Also in the following figures, alphabetical suffices f or g are affixed to the same reference numerals according to the similar concept and the repeated explanation is omitted.)

Figure 11:
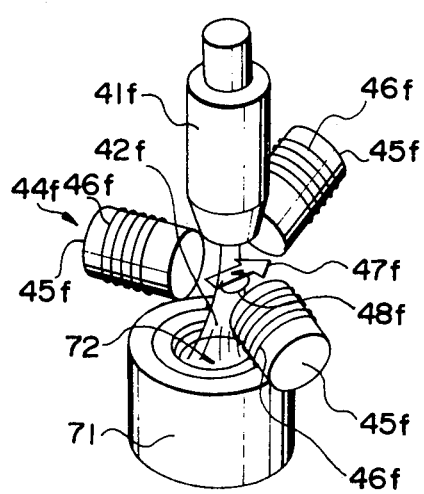
FIG. 11 is an abbreviated perspective view showing an example of melting apparatuses.

Next, FIG. 11 shows an example of an apparatus in which an object to be treated is melted. In this embodiment, numeral 71 represents a container having a treatment region formed at its central part. This container is made of heatproof material or copper and is adapted to be cooled by a coolant such as water. Numeral 72 represents such a material to be melted as tin, other metal or other raw material to be melted and it is put in the container 71. In this apparatus, the enlarged plasma 42f is projected widely on the material to be melted so the material 72 is melted homogeneously without boiling resulting from the heating developed locally and without leaving any unmolten portion. When the material 72 is melted while it is thrown in the container 71, the material 72 newly thrown in is heated quickly by the unenlarged plasma directed towards the material 72 and then heated as a whole and homogeneously by the enlarged plasma. In this case, the operation to direct the plasma 42f to the material 72 to be melted is established by eliminating the rotating magnetic field or by deflecting the plasma 42f with a magnetic field not rotating.

Figure 12:
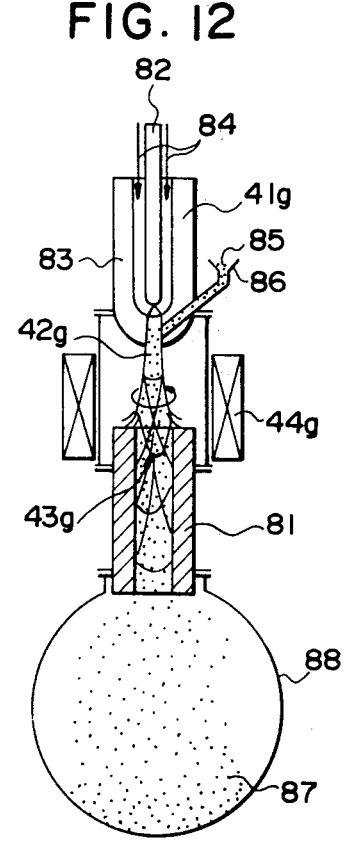
FIG. 12 is an abbreviated front elevational view of a chemical reaction apparatus.

Next, FIG. 12 shows an apparatus in which powdered or granular materials to be treated are made to react chemically. In this embodiment, such a plasma torch 41g of transfer type is used in which a direct current voltage is applied between a ring-shaped or cylindrical positive electrode 81 and a negative electrode 82 and a gas introduced through between a nozzle 83 and the negative electrode 82 as shown by an arrow 84 is ionized to be ejected out. Of course, this gas is one which is required in order to make the materials to be treated react. The material to be treated 85 is thrown through a raw material conduit 86 and mixed with a plasma 42g ejected from the torch 41. (The material to be treated is coal when coal is decomposed with heat or when acetylene, carbon monoxide or hydrogen is produced through synthesis or reduction from coal reacting with atmospheres such as hydrogen, carbon dioxide air or water vapour or the material to be treated is aluminum when aluminum nitride is to be produced through the nitrification of powdered aluminum by a nitrogen plasma). The material 85 introduced reacts in the plasma 42g (in this case, the whole region of the plasma 42g is the treatment region.) and a resulting product 87 is withdrawn into a collecting chamber 88. Also in this case, the plasma is rotated and enlarged by applying the rotating magnetic field and thus the low temperature layer existing between the plasma and the positive electrode in the absence of the rotating magnetic field is reduced, the concentrated plasma energy being dispersed resulting in homogeneous distribution of temperature. Consequently the material 85 has more chances of contacting with the enlarged plasma than with the unenlarged plasma and the difference in reactions of the powdered material passing through the central portion of the plasma and that passing through the outer portion is reduced because of the homogeneous temperature distribution. Thus, the resulting product is very homogeneous as a whole. The same effect is obtained also without using the ring-shaped positive electrode if the rotating magnetic field generating means is mounted around a nozzle of a nontransfer type plasma torch in which a plasma jet is ejected from the nozzle as the result of a discharge between the nozzle and a negative electrode or around the inductively produced plasma ejected together with raw material as shown in FIG. 10.

Figure 13:
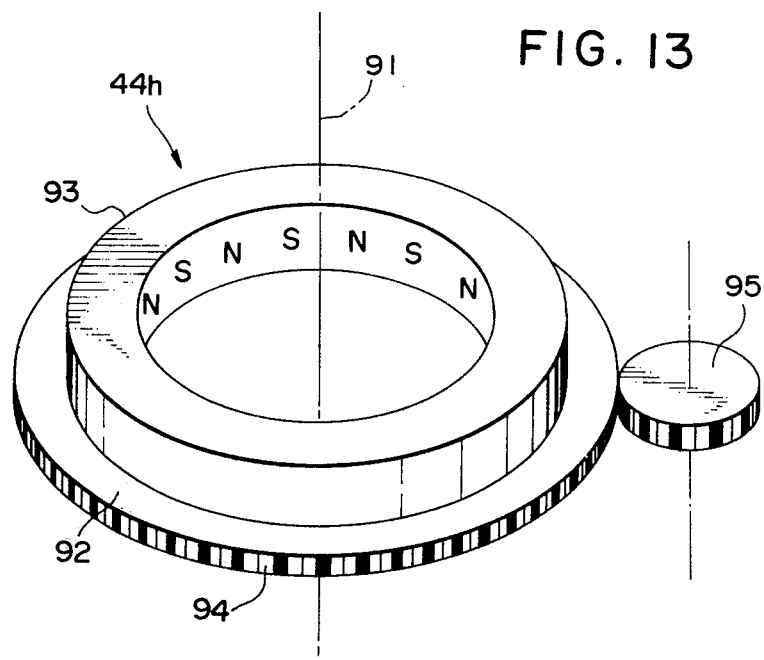
FIG. 13 is a perspective view showing a different embodiment of the means to generate the rotating magnetic field.

Next, FIG. 13 shows a different embodiment 44h of the rotating magnetic field generating means which comprises a holding frame 92 supported rotatably around the central axis 91 of the plasma in a well-known manner and a plurality of magnets 93 set on the inside surface of the holding frame 92 with alternating N and S poles. The magnet 93 may be a permanent magnet or an electromagnet which is fed from a power source through usual sliprings. On the outside surface of the holding frame 92, a gear 94 is formed, which is in mesh with and actuated by a driving gear 95 connected to a driving source such as an electric motor.

In the means thus constructed, the rotational speed of the rotating magnetic field is controlled by changing that of the driving source and the intensity of the rotating magnetic field is changed by adjusting the current to an electromagnet if it is used as the magnet 93.

Figure 14:
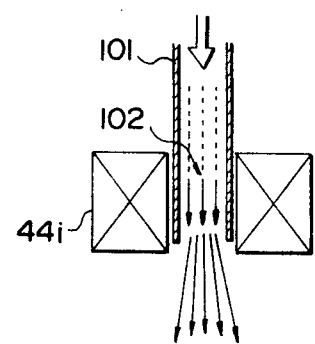
FIG. 14 is an abbreviated front elevation in section showing an apparatus to heat an electrically conductive gas with the rotating magnetic field.

Next, FIG. 14 shows an embodiment of an apparatus in which an electrically conductive gas is heated to a high temperature and changed into a plasma. In this figure, an electrically conductive gas at a high or low temperature, which is fed from a gas feeding mechanism (not shown) through a pipe 101, is subject to a rotating force due to a rotating magnetic field and is heated by an induction current induced in the gas by the rotating magnetic field when the gas passes through a region 102 where the rotating magnetic field is applied by the rotating magnetic field generating means 44i. The gas is heated and changed into plasma due to this induction heating and is ejected from an end of the pipe 101 towards the treatment region. It is also possible to heat the electrically conductive gas and to change it into plasma at a still higher temperature with a multi-pole magnetic field generating means set around a straight line prolonged from the pipe 101 or a long magnetic field generating means along the line.

We claim:

1. Apparatus for melting metal comprising:
   i. a crucible for containing metal to be melted therein
   ii. a plurality of plasma-forming nozzle devices positioned in fixed relationship with respect to said crucible, each device having means for forming a plasma jet, each such jet forming means being positioned so as, when there is metal in the crucible to be melted, to be directed towards a respective one of a plurality of distinct surface portions of said metal
   iii. a first source of direct electric current having two poles, one said pole being electrically connected to each of said nozzle devices, the other said pole being electrically connected to said metal in said crucible
   iv. means for generating a magnetic field across said surface portions of said metal in a direction extending at an inclination to the direction in which a respective plasma jet is formed by each said plasma jet forming means, whereby said magnetic field will act on each plasma jet to deflect it,
   v. a second source of electric current connected to said magnetic field generating means for supplying current thereto, and
   vi. means for controlling the electric current supplied by said second source independently of said direct current, thereby to control said magnetic field to oscillate said plasma jets.

2. Apparatus for melting metal, as claimed in claim 1, wherein said second source of electric current comprises means for supplying an alternating current.

3. Apparatus for melting metal, as claimed in claim 1, wherein said second source of electric current comprises means for supplying a superposed direct and alternating current.

* * * * *